United States Patent [19]

Mittelhäuser et al.

[11] Patent Number: 5,059,014

[45] Date of Patent: Oct. 22, 1991

[54] EXTERNAL REARVIEW MIRROR FOR MOTOR VEHICLES

[75] Inventors: Bernhard Mittelhäuser, Am Krähenberg, 3002 Wedemark 2; Jan Schubert, Wedemark, both of Fed. Rep. of Germany

[73] Assignee: Bernhard Mittelhäuser, Wedemark, Fed. Rep. of Germany

[21] Appl. No.: 568,274

[22] Filed: Aug. 15, 1990

[30] Foreign Application Priority Data

Aug. 16, 1989 [DE] Fed. Rep. of Germany ....... 3926892

[51] Int. Cl.⁵ .......................... G02B 5/08; B60R 1/06
[52] U.S. Cl. ..................... 359/841; 248/479; 359/877
[58] Field of Search ............ 350/604, 632, 634, 636, 350/637; 248/479, 549, 900

[56] References Cited

U.S. PATENT DOCUMENTS 4,895,337  1/1990  Oskam et al. ................. 350/636
4,969,727 11/1990  Harloff et al. ................. 350/637

FOREIGN PATENT DOCUMENTS 2826938  1/1980  Fed. Rep. of Germany ...... 350/604
3017228 11/1981  Fed. Rep. of Germany ...... 350/632
0145041 11/1980  Japan ................................ 350/604
0092131  5/1985  Japan ................................ 350/604
0001653  1/1987  Japan ................................ 350/637

*Primary Examiner*—Bruce Y. Arnold
*Assistant Examiner*—R. D. Shafer
*Attorney, Agent, or Firm*—Robert W. Becker & Associates

[57] ABSTRACT

An external rearview mirror for a motor vehicle is provided. The mirror housing, in which is disposed a mirror pane, is secured on a mounting in such a way as to be pivotable about a vertical axis into a park position. In a region remote from the pivot axis, the mirror housing is guided by curved guide means that includes teeth with which is associated at least one gear wheel in such a way that rotation of the gear wheel effects a pivoting of the mirror housing.

6 Claims, 2 Drawing Sheets

EXTERNAL REARVIEW MIRROR FOR MOTOR VEHICLES

BACKGROUND OF THE INVENTION

The present invention relates to an external rearview or side view mirror for a motor vehicle, and includes a mirror housing that is open on one side to receive a mirror pane, and also includes a bracket or mounting that is secured on a side wall of the vehicle, with the mirror housing being pivotably mounted on the mounting in such a way as to be pivotable about an approximately vertical axis, for example into a park position, and with the mirror housing, in a region thereof remote from the pivot axis, being provided with curved guide means.

With this type of mirror, it is often desirable to intentionally carry out a pivot movement of the laterally projecting mirror housing, for example to improve the parking possibilities for the vehicle.

Based upon these preconditions, it is an object of the present invention to embody a mirror of the aforementioned general type in such a way that via straightforward means, a motor-driven pivoting of the mirror housing is possible to thus enable, via actuation of a switch, a pivoting of the mirror housing out of and back into an operative position.

BRIEF DESCRIPTION OF THE DRAWINGS

This object, and other objects and advantages of the present invention, will appear more clearly from the following specification in conjunction with the accompanying schematic drawing, in which.

SUMMARY OF THE INVENTION

Figure 1:
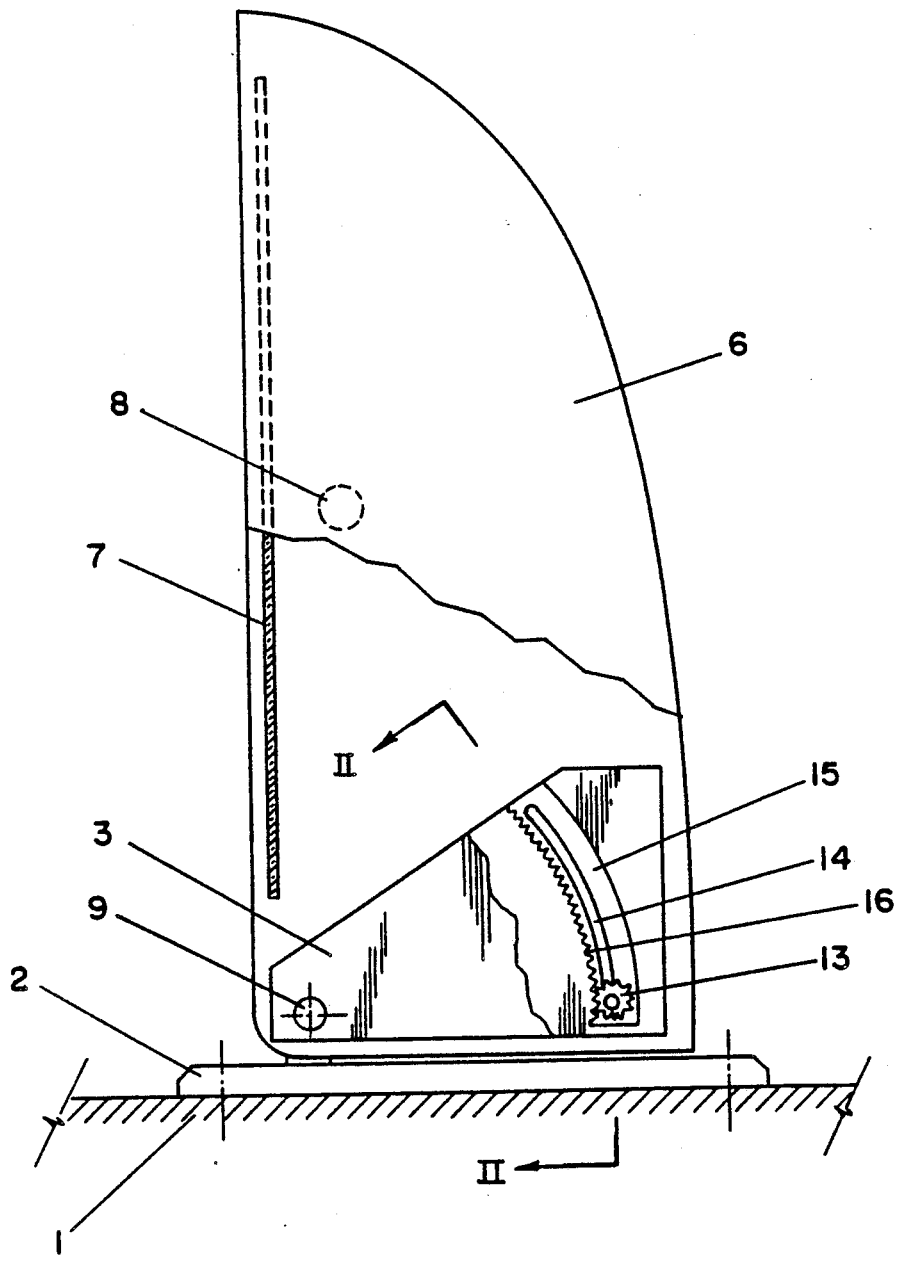
FIG. 1 is a plan view of one exemplary embodiment of the inventive external rearview mirror in its operative position.

The external rearview mirror of the present invention is characterized primarily in that the curved guide means for the mirror housing includes teeth with which are associated at least one driveable pinion or gear wheel in such a way that a rotation of the gear wheel effects a pivoting of the mirror housing. In this way, the teeth, i.e. the positive engagement of the gear wheel, can already effect the guidance of the mirror housing during a pivoting movement, although shaft stumps that extend beyond the gear wheel can also be provided that then engage in correspondingly dimensioned and similarly curved slots.

In order on the one hand to achieve fixed retention of the mirror housing not only in the normal position but also during pivoting, the mirror housing is expediently provided with a projection that is delimited by parallel surfaces and is mounted, with little play, between pieces of the mirror base, i.e. the mounting for securing the mirror to the vehicle. This projection of the mirror housing can advantageously also serve to accommodate a motor, and can therefore have a box-shaped configuration. The gear wheels and shaft stumps are then provided on the outside of this projection. Consequently, the inner sides of the pieces of the mounting must be provided with the teeth and the curved slots for engagement with the gear wheels and shaft stumps.

Further specific features of the present invention will be described in detail subsequently.

DESCRIPTION OF PREFERRED EMBODIMENTS

Referring now to the drawing in detail, secured on a side wall 1 of a vehicle, which side wall extends in the longitudinal direction of the vehicle, is a bracket or mounting 2 for the external rearview mirror; this mounting serves as the securement base. The securement is effective with screws. The mounting 2 is provided with two spaced-apart pieces 3 that have inner faces 4 which are disposed parallel to one another and extend essentially horizontally. Projecting into the space formed between the two pieces 3 is a box-shaped projection 5 of the mirror housing 6, which is open toward one side and is provided with a mirror pane 7 that is disposed in this opening. The mirror pane 7 is adjustable in a conventional manner via a ball-and-socket joint, which is indicated by the reference numeral 8.

Approximately at the level of the mirror pane 7, the mirror housing 6 can be pivoted about an essentially vertical axis in the form of a pin 9, in the direction of the arrow 10, in such a way that the mirror housing 6, along with the mirror pane 7, can, when viewed in the direction of travel of the vehicle, be pivoted toward the rear into a position that on the whole saves space.

The pin 9 extends not only through the two pieces 3, but also through the projection 5, the width of which is such that it is guided and held with little play between the two faces 4.

In order to be able to pivot the mirror into the park position, i.e. in the direction of the arrow 10, there is disposed within the projection 5 an electric motor, which is indicated schematically by the reference numeral 11, with the leads to the motor not being shown. The drive shaft 12, which extends parallel to the pin 9, emerges or extends out on both sides accompanied by the formation of stump ends 12', one of which carries a pinion or gear wheel 13. In conformity with the curved pivot path of the stump ends 12', curved slots 14 are provided on the inner sides of the two pieces 3. On one side, a narrow slot 14 is provided for receiving one of the stump ends 12', whereas on the opposite side, in addition to the slot 14, a similarly curved widened portion 15 is also provided for accommodating the gear wheel 13. On the side closer to the pin 9, the widened portion 15 is provided with teeth 16 that mesh with the gear wheel 13.

Consequently, an actuation of the motor, i.e. a rotation of the gear wheel 13, leads to a pivoting of the projection 5 and hence of the mirror housing 6 in the direction of the arrow 10. A reverse of the motor would then return the mirror housing 6 from the park position back into the illustrated normal or perpendicular position.

Control of the electric motor can be effected by limit switches; briefly turning the motor on would then lead to the park position, whereas again turning the motor on manually would result in the illustrated operative position of the mirror.

Although in the illustrated embodiment the pivot axis is shown as being in the form of a pin 9, it is also possible to utilize something similar to the aforementioned drive mechanism for such a mirror. In such a case, two pivot shafts would be disposed one behind the other in the longitudinal direction of the vehicle in such a way that the mirror could on the one hand be pivoted toward the front, and on the other hand could also be pivoted toward the rear. The present invention is also applicable to such mirrors having two pivot shafts where the pivotal connection of the mirror housing is effected via a swivel arm that is connected at both ends (DE-PS 30 17 228).

It should be noted that in order to form end stops for the pivot movement, the curved slots 14 are closed off at both ends, as can be seen in FIG. 1.

Figure 2:
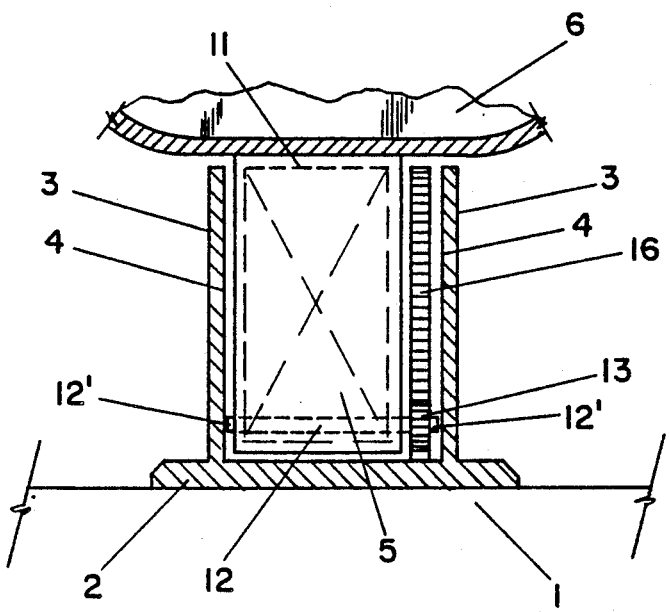
FIGS. 2 & 3 is a cross-sectional view taken along the line II—II in FIG. 1.
Figure 3:
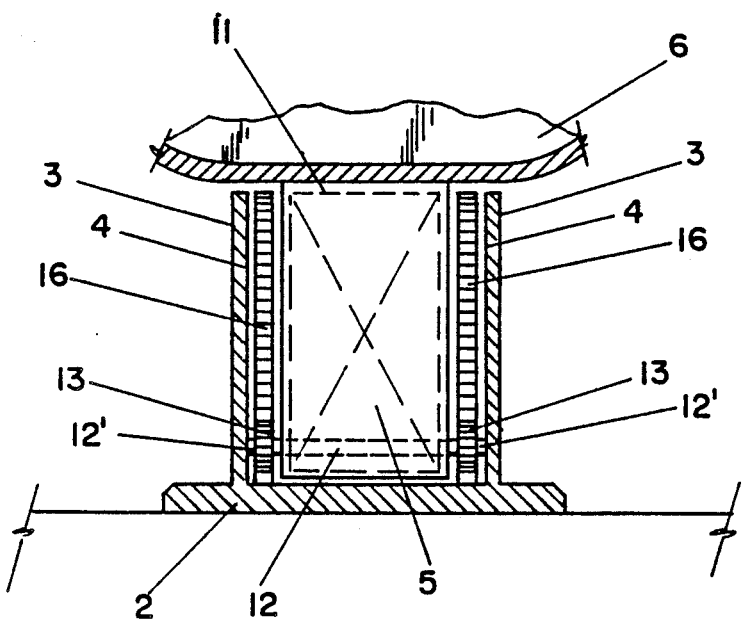

FIG. 2 illustrates one embodiment with a gear wheel 13 on one of the stump ends 12', FIG. 3 illustrates another embodiment where both of the stump ends 12' are provided with gear wheels 13, whereupon widened portions 15, are provided with teeth 16.

The present invention is, of course, in no way restricted to the specific disclosure of the specification and drawing, but also encompasses any modifications within the scope of the appended claims.

What we claim is:

1. In an external rearview mirror for a motor vehicle, including a mirror housing that is open on one side to receive a mirror pane, and also includes a mounting that is secured on a side wall of said vehicle, with said mirror housing being pivotably mounted on said mounting in such a way as to be pivotable about an approximately vertical axis, and with said mirror housing, in a region thereof remote from said pivot axis, being provided with curved guide means, the improvement wherein:

said curved guide means includes teeth;
at least one driveable gear wheel is provided that meshes with said teeth in such a way that rotation of said gear wheel effects the pivoting of said mirror housing;
said mounting is provided with two pieces having respective inner faces that are disposed parallel to one another, with said curved guide means and said teeth thereof being provided on said inner faces;
said mirror housing is provided with a projection that, with little play, is disposed between said inner faces, with said at least one gear wheel being disposed on said projection; and
said projection accommodates an electric motor for driving said at least one gear wheel.

2. A mirror according to claim 1, in which said projection has a box-shaped configuration.

3. A mirror according to claim 1, in which said teeth are provided on a side of said guide means closest to said pivot axis.

4. A mirror according to claim 1, in which said projection of said mirror housing is provided with a driveable shaft on which said at least one gear wheel is disposed, with a respective stump end of said shaft projecting beyond each gear wheel; and with the respective inner face of said pieces of said mounting being provided as part of said guide means, with a curved widened portion that serves to receive one of said gear wheels and further includes a curved slot for the stump end, with said teeth being provided on said widened portion.

5. A mirror according to claim 4, in which both stump ends of said shaft are provided with a gear wheel, with each of the pertaining widened portions being provided with teeth for engagement with said gear wheels.

6. A mirror according to claim 4, in which each of said curved slots for said stump ends of said shaft are closed off and have end faces to form end stops for said stump ends.

* * * * *